March 23, 1937. D. L. GALLUP 2,074,724
BRAKE MECHANISM
Filed May 26, 1931
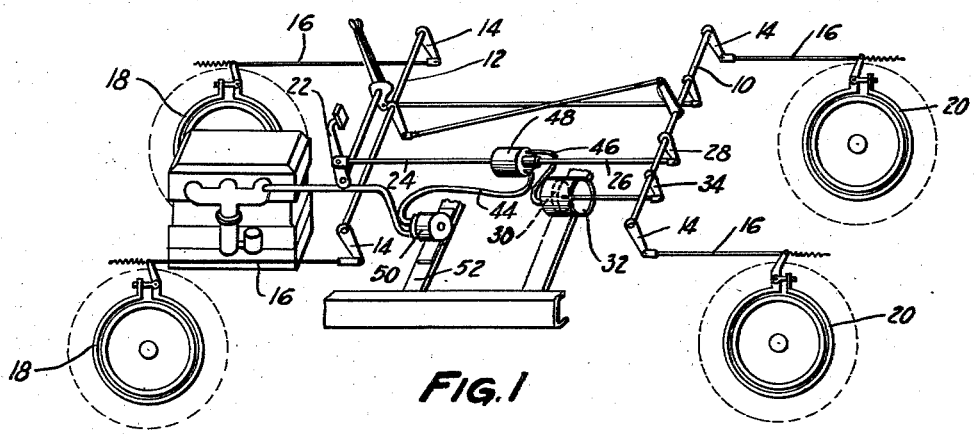
FIG. 1
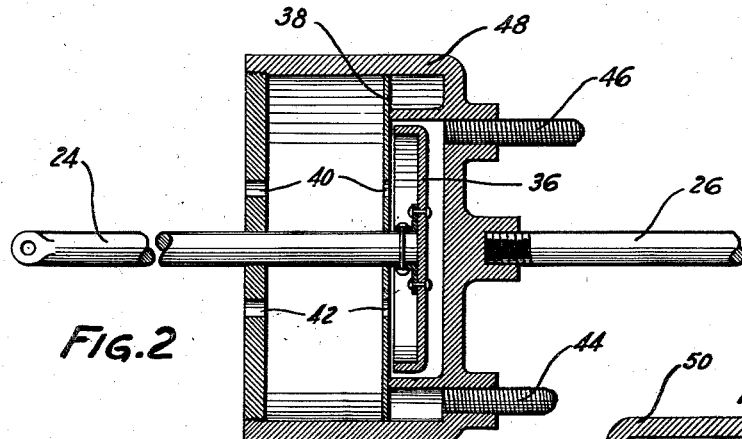
FIG. 2
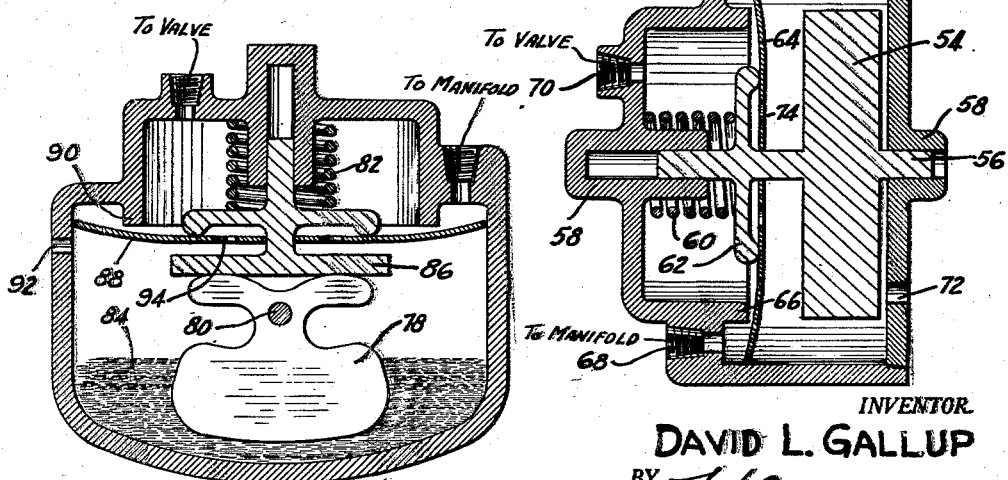
FIG. 3
FIG. 4
INVENTOR.
DAVID L. GALLUP
BY
ATTORNEY.

Patented Mar. 23, 1937

2,074,724

UNITED STATES PATENT OFFICE 2,074,724

BRAKE MECHANISM

David L. Gallup, South Bend, Ind., assignor to Bendix Brake Company, South Bend, Ind., a corporation of Illinois Application May 26, 1931, Serial No. 540,103

28 Claims. (Cl. 188—181)

This invention relates to power transmission mechanism, and more particularly to such mechanism used in the brake structure of automotive vehicles.

In the conventional power operated brake mechanism for the heavier automotive structures such as busses and trucks, the servo motor or power actuator is usually controlled by means of a manually operated valve. The valve structure is furthermore such that both the inception of operation and the degree of operation of the actuator are functions of the relation of the manually operable valve control means to the remaining structures. In other words, the entire control of the power means for operating the brake structure is dependent upon the operator of the vehicle.

It often happens, however, that the operator applies the brakes, or rather the valvular control for the brakes, in such fashion that the car is decelerated to such a degree that the disadvantage incurred by such high deceleration, i. e. the violent throwing of the passengers forward in their seats, outweighs the advantages of the high degree of braking.

It is therefore the principal object of the invention to provide means, entirely automatic in actuation, which will serve when and if the deceleration reaches a predetermined maximum to either cut out entirely or at least reduce the effect of the power operation of the driven mechanism, thereby eliminating the human element in the control of the valvular mechanism during the cut-in phase of the operation.

It is a further object of the invention to provide a mechanism whose operation is solely a function of the deceleration of the vehicle, and in one embodiment there is provided an inertia means adapted to actuate an auxiliary or secondary valve in circuit with the source of power to control the degree of power output.

Other objects of the invention and desirable details of construction will become apparent from the following description of one illustrated embodiment shown in the accompanying drawing, in which:

Figure 1 is a diagrammatic view of a power brake mechanism for an automotive vehicle embodying my novel auxiliary cut-out;

Figure 2 discloses in section the primary valve mechanism adapted to be manually operated to control the actuator of Figure 1;

Figure 3 discloses in detail one form of cut-out valve embodying the features of my invention; and Figure 4 discloses a second form of auxiliary valve similar in operation to the valve of Figure 3.

There is disclosed in Figure 1, a conventional brake mechanism for an automotive vehicle comprising, briefly, power transmission linkage comprising cross shafts 10 and 12 connected by arms 14 to rods 16 connected to the road wheel front and rear brakes 18 and 20, respectively. The aforementioned linkage is adapted to be driven either manually from a brake operating pedal 22 connected by links 24 and 26 to arm 28 on shaft 10 or by power from piston 30 of a power actuator or servo motor 32 through link 34 to the shaft 10.

The servo motor, which is preferably energized through the intermediary of the vacuum derived from the intake manifold of the engine, is controlled by a valve mechanism comprising, briefly, a disk valve 36 connected to link 24 to be actuated by the pedal. The valve disk member 36 is adapted to contact a second flexible disk valve member 38 normally spaced from member 36 in brake off position.

Actuation of the pedal serves to first clamp disk 36 against disk 38 to close off the air vent through ports 40 and 42, and further movement of disk 36 distorts member 38 and places conduit 44 in circuit with the motor conduit 46 to energize the motor and apply the brakes. The time at which the piston begins to move as well as the degree of air evacuation, with the consequent degree of power output, are both dependent upon the position of the service pedal 22 in its arc of throw; this for the reason that the degree of relative movement in the valve parts determines when the valve is cracked, and for the further reason that the degree of power output is controlled by holding the pedal stationary during the act of applying the brakes, the piston 30 following up under the action of the atmosphere to close off the vacuum by means of link 26 actuating valve casing part 48 to abut disk valve member 38 and thus hold the brakes applied with a given force. This action is known as a "follow up" movement to "lap" the valve.

The operator of a vehicle may, however, inadvertently fail to control the degree of power application of the brakes by subconsciously or consciously failing to stop the movement of the service pedal and thus prevent the aforementioned follow up action. With the high energy capacity of the conventional power actuator as the result of the pumping action of the cylinders of the engine, this failure of manual control inevitably results in too great a load or power output upon the brakes with the consequent high deceleration of the vehicle. The deceleration is in fact a progressively increasing one with the valve so operated and the consequent progressive load increase from the servo motor.

It often happens that such an inadvertent deceleration without warning to the other occupants of the vehicle results in their being violently thrown against the windshield or the forward portion of the rear seat compartment.

To the end that such untoward operation of the vehicle may be obviated there is suggested the interposition of an auxiliary control or cut-out valve in circuit with the conduit connecting the intake manifold with the main control valve of the actuator. In that embodiment of the valve disclosed in detail in Figure 3 there is provided a casing 50 rigidly mounted to a portion of the chassis such as a cross member 52, Figure 1. A cylindrical weight or inertia member 54 is keyed or otherwise rigidly secured to a shaft 56, the latter being slidably journaled in bearings 58 in the end plates of the valve casing.

The inertia member 54 is normally held to the right of the casing as disclosed in Figure 3, by means of a spring 60 acting on a disk thrust member 62 secured to the shaft 56, the member 62 forcing a disk valve or diaphragm member 64 out of engagement with an annular flange 66 forming an integral part of the valve casing and constituting a seat for the valve member 64.

In operation, should the operator apply the brakes too severely or move the pedal continuously to the floor board, the resultant deceleration, if equal to or exceeding a predetermined maximum, will serve to move the weight 54 and its connected parts to the left in Figure 3, this by virtue of the inertia of the parts. The movement of the member 54 first permits the flexed disk 64 to seat on the flange 66 to cut-off the vacuum port 68 from communication with port 70 connected to the actuator; this serves to cut-off the vacuum source which at the time is evacuating the air from the left side of the actuator and applying the brakes. The brakes are then held as applied, the pull from the motor remaining a constant.

The driver, after the automatic cut-off of the vacuum, involuntarily continues to move, or at least try to move, the pedal but the sudden increase in feel due to the reaction from the brake rigging serves to warn him of the operation of the cut-off valve and suffices to obviate further direct inadvertent manual actuation of the brakes.

With the brake applying force a constant, it follows that the deceleration is a constant, which factors are predetermined by the setting of the cut-off valve parts, the mass of the moving parts and the resistance of the spring 60 being the adjustable variables to determine the desired maximum deceleration. The spring 60 may be of such a resistance as to permit the continued movement of the inertia mass to the left after the disk valve is seated. In this event, the power actuator is entirely cut out, air being admitted to the left side of the actuator by openings 72 in the valve casing, openings 74 in the disk valve 64, thence through the control valve and conduit 46 to the actuator. The entire load or draft of the brakes is then suddenly imposed upon the driver's foot at the pedal and unless he instantly compensates for this load by increasing the manual pressure the brakes are released. The aforementioned cut-off or lapping action of the valve is, however, preferred to the cut-out operation last described.

In the design shown in Figure 4 an irregular shaped inertia member 78 is pivotally mounted on a pin 80 secured to the valve casing, and when the deceleration equals or exceeds a predetermined maximum the member 78 rocks on the pin as a pendulum overcoming the resistance of spring 82 and a damping liquid 84 to actuate a valve controlling member 86, either permitting the disk valve 88 to seat on the flange 90 to maintain the degree of servo motor load or entirely cut out the power actuation by venting the latter to atmosphere by ports 92 and 94, the operation being similar to the embodiment disclosed in Figure 3. It will be noted that the valvular cut-out of Figure 4 opens in both directions of vehicle movement.

There is thus provided a very simple, economical, and effective governor mechanism for servo motor actuating mechanism which automatically limits the degree of power actuation of the driven mechanism to a predetermined maximum, thereby reducing the hazard of inadvertent overcontrol.

While two illustrative embodiments of my invention have been described in detail, it is not my intention to limit its scope to those particular embodiments or otherwise than by the terms of the appended claims.

I claim:

1. A braking system for an automotive vehicle provided with an internal combustion engine and an intake manifold, in combination with brakes, valve means, a manually operable member for controlling said valve, a servo motor and connections between said manifold, valve and motor providing an air circuit, an auxiliary valve member in circuit with said aforementioned connections, said valve member comprising a casing secured to the chassis of the vehicle and a floating inertia member, stationary except when the acceleration or deceleration of the vehicle exceeds a certain predetermined value, movable within the casing at a predetermined deceleration of the vehicle to interrupt said circuit and thereby automatically control the energization of said motor and its load on the brakes.

2. A braking system for an automotive vehicle comprising, in combination with a brake structure, a servo motor for operating said brake structure, valve mechanism for controlling said motor, a manually operable member connected to a part of said valve mechanism, other parts of said valve mechanism being connected by linkage with the aforementioned brake structure whereby said valve mechanism functions as a tension element in the connection between said manually operable member and the brake structure after the relative movement between said valve parts is effected to actuate the valve structure, together with means for automatically cutting off the operation of said motor while maintaining predetermined power thereof as a function of the degree of deceleration of the vehicle, said means comprising a valve.

3. A braking system for an automotive vehicle including a vehicle body comprising in combination with a brake structure, an operating means, servo motor means for operating said brake structure, a valve for said servo motor means having movable parts one of which is connected to said operating means and the other of which is connected independently to said brake structure, together with an independent and self contained governor controlled valve unit mounted on the vehicle body for automatically controlling the energization of the servo motor, the actuation of said control valve means being solely a function of the degree of deceleration of the vehicle body and operating independently of changes in the speed of rotation of the driving wheels, and together with a source of fluid pressure different from atmospheric pressure which may at times be connected with said servo motor means through said control valve means but which is automatically cut off from said servo motor means by said control valve means when the control valve means is actuated by the deceleration of the vehicle.

4. A braking system for an automotive vehicle including a vehicle body comprising in combination with a brake structure, servo motor means having an operating valve for operating said brake structure together with an independent and self contained governor controlled valve unit mounted on the vehicle body for automatically controlling the energization of the servo motor, the actuation of said control valve means being solely a function of the degree of deceleration of the vehicle body and operating independently of changes in the speed of rotation of the driving wheels, and together with a source of fluid pressure different from atmospheric pressure which may at times be connected with said servo motor means through said control valve means but which is automatically cut off from said servo motor means by said control valve means when the control valve means is actuated by the deceleration of the vehicle, a conduit connecting said source of fluid pressure different from atmospheric pressure with said governor controlled valve, a conduit connecting said governor controlled valve means with said operating valve, and a conduit connecting said operating valve with said servo motor means.

5. A braking system for an automotive vehicle including a vehicle body comprising in combination with a brake structure, servo motor means having an operating valve for operating said brake structure together with an independent and self contained governor controlled valve unit mounted on the vehicle body for automatically controlling the energization of the servo motor, the actuation of said control valve means being solely a function of the degree of deceleration of the vehicle body and operating independently of changes in the speed of rotation of the driving wheels, and together with a source of fluid pressure different from atmospheric pressure and a passageway connecting said source of fluid pressure different from atmospheric pressure with said servo motor means through said control valve means, said source of fluid pressure different from atmospheric pressure being automatically cut off from said servo motor means by said control valve means when the control valve means is actuated by the deceleration of the vehicle, said system including means whereby upon acceleration of said vehicle the passageway through said control valve from said source of fluid pressure differential to the other said valve is maintained open.

6. A braking system for an automotive vehicle comprising a foot pedal, a brake structure, a fluid pressure servo motor for operating said brake structure, a control valve mechanism for controlling said motor, and means comprising a second valve mechanism for limiting the operating power supplied by said motor automatically to a predetermined effective factor dependent upon the degree of deceleration of the vehicle and for allowing the increase of the operating power supplied by said motor automatically when the deceleration decreases, said control valve mechanism having relatively movable parts, one of which is connected to said pedal and the other of which is connected to said brake structure whereby said brake structure may be operated manually.

7. A braking system for an automotive vehicle comprising a brake structure, a fluid pressure servo motor for operating said brake structure, a control valve mechanism for controlling said motor, means comprising a second valve mechanism for limiting the operating power supplied by said motor automatically to a predetermined effective factor dependent upon the degree of deceleration of the vehicle and for allowing the increase of the operating power supplied by said motor automatically when the deceleration decreases, a source of fluid pressure different from atmospheric pressure, a conduit connecting said source with said second valve mechanism, a conduit connecting said second valve mechanism with the control valve mechanism, and a conduit connecting the control valve mechanism with the fluid pressure servo motor.

8. A braking system for an automotive vehicle comprising a brake structure, a fluid pressure servo motor for operating said brake structure, a control valve mechanism for controlling said motor, a source of fluid pressure different from atmospheric pressure, means providing communication at times between said source of pressure different from atmospheric pressure and said control valve mechanism, said means including a second valve mechanism for limiting the operating power supplied by said motor automatically to a predetermined effective factor dependent upon the degree of deceleration of the vehicle and for allowing the increase of the operating power supplied by said motor automatically when the deceleration decreases, and means for actuating said second valve mechanism so that upon acceleration of the vehicle the valve is held to open the communication between said source of pressure different from atmospheric pressure and the control valve mechanism, and so that the actuation of said second valve is solely a function of the degree of deceleration of the vehicle body and operates independently of changes in the speed of rotation of the driving wheels.

9. A braking system for an automotive vehicle comprising a brake structure, a brake pedal, a servo motor, a valve mechanism having relatively movable parts one of which is connected to said pedal and the other of which is connected to said brake structure for operating said brake structure manually for controlling said motor, and means automatically operable when the rate of deceleration reaches a predetermined constant for maintaining the then existing power loading of the brake structure, said means including an inertia controlled governor.

10. A braking system for an automotive vehicle comprising a brake structure; a servo motor; a primary valve mechanism for controlling said motor; a source of fluid pressure different from atmospheric pressure; means automatically operable when the rate of deceleration reaches a predetermined constant for maintaining the then existing power loading of the brake structure, said means including an inertia controlled governor and a secondary valve mechanism controlled by said governor; a conduit connecting said source with said secondary valve mechanism; a conduit connecting said secondary valve mechanism with the primary valve mechanism; and a conduit connecting the primary valve mechanism with the fluid pressure servo motor.

11. A braking system for an automotive vehicle comprising a brake structure; a servo motor; a primary valve mechanism for controlling said motor; a source of fluid pressure different from atmospheric pressure; and means automatically operable when the rate of deceleration reaches a predetermined constant for maintaining the then existing power loading of the brake structure, said means including a secondary valve mechanism which secondary valve mechanism is effective at times to connect said source to said primary valve mechanism, and is effective at other times to connect said primary valve mechanism with the atmosphere, and effective at other times to disconnect said primary valve mechanism from both the atmosphere and said source, and means comprising an inertia controlled governor for actuating said secondary valve mechanism solely as a function of the degree of deceleration of the vehicle body and operating therefor independently of changes in the speed of rotation of the driving wheels.

12. A braking system for an automotive vehicle comprising a brake structure; a servo motor; a primary valve mechanism for controlling said motor; a source of fluid pressure different from atmospheric pressure; means providing at times a communication between said source of pressure different from atmospheric pressure and said primary valve, and means automatically operable when the rate of deceleration reaches a predetermined constant for maintaining the then existing power loading of the brake structure, said means including an inertia controlled governor, a secondary valve mechanism arranged so that acceleration of the vehicle holds open the communication between said source of pressure differentials and the primary valve, and the actuation of said secondary valve mechanism being solely a function of degree of deceleration of the vehicle body and operating independently of changes in the speed of rotation of the driving wheels.

13. A braking system for an automotive vehicle comprising a brake structure; a pedal; a source of fluid under pressure different from atmospheric pressure; a servo motor; a primary valve mechanism for controlling said motor having relatively movable parts one of which is connected to said pedal and the other of which is connected to said brake structure whereby said brake structure may be actuated manually; and means automatically operable when the rate of deceleration reaches a predetermined constant for maintaining the then existing power loading of the brake structure, said means including an inertia controlled governor, and a secondary valve controlled thereby and movable from a position in which the servo motor is actuated by fluid under pressure different from atmospheric pressure from said source to apply pressure to the brakes, through a position in which a portion of the fluid under pressure different from atmospheric pressure is trapped, to a position in which the trapped fluid is vented.

14. A braking system for an automotive vehicle comprising a brake structure; a pedal; a source of fluid under a pressure different from atmospheric pressure; a servo motor; a primary valve mechanism for controlling said motor; means automatically operable when the rate of deceleration reaches a predetermined constant for maintaining the then existing power loading of the brake structure, said means including an inertia controlled governor, and a secondary valve controlled thereby and movable from a position in which the motor is actuated by fluids under pressure different from atmospheric pressure to apply pressure to the brakes, through a position in which one of the fluids under pressure different from atmospheric pressure is trapped, to a position in which the trapped fluid is vented; a conduit connecting said source with said secondary valve mechanism; a conduit connecting said secondary valve mechanism with the primary valve mechanism; and a conduit connecting the primary valve mechanism with the servo motor.

15. A braking system for an automotive vehicle comprising a brake structure; a source of fluid pressure different from atmospheric pressure; a servo motor; a valve mechanism for controlling said motor; means providing a communication between said source of fluid pressure different from atmospheric and said controlling valve mechanism and means automatically operable when the rate of deceleration reaches a predetermined constant for maintaining the then existing power loading of the brake structure, said means including an inertia controlled governor, and a valve included in said communication means and controlled by said governor and actuated solely as a function of the degree of deceleration of the vehicle body and operating independently of changes in the speed of rotation of the driving wheels, so that it is movable from a position in which the motor is actuated by fluids under differential pressure to apply pressure to the brakes, through a position in which some of the fluid under pressure different from atmospheric pressure is trapped, to a position in which the trapped fluid is vented, said governor controlled valve being arranged so that acceleration of the vehicle holds open the communication between said source of fluid pressure different from atmospheric pressure and the controlling valve mechanism.

16. A braking system for an automotive vehicle comprising a brake structure, a brake pedal, a servo motor, a valve mechanism for controlling said motor and provided with relatively movable parts, one of which is connected to said pedal and the other of which is connected to said brake structure for operating said brake structure manually, and means automatically operable when the rate of deceleration reaches a predetermined constant for maintaining the then existing power loading of the brake structure, said means including an inertia controlled governor comprising a weighted member mounted in aligned guides for movement longitudinally of the vehicle and controlled by the rate of change of velocity.

17. A braking system for an automotive vehicle comprising a brake structure; a brake pedal; a servo motor; a primary valve mechanism for controlling said motor; means automatically operable when the rate of deceleration reaches a predetermined constant for maintaining the then existing power loading of the brake structure, said means including a secondary valve mechanism, an inertia controlled governor comprising a weighted member mounted in aligned guides for movement longitudinally of the vehicle and controlled by the rate of change of velocity; a source of fluid pressure different from atmospheric pressure; a conduit connecting said source with said secondary valve mechanism; a conduit connecting said secondary valve mechanism with the primary valve mechanism; and a conduit connecting the primary valve mechanism with the servo motor.

18. A braking system for an automotive vehicle comprising a brake structure; a brake pedal; a servo motor; a primary valve mechanism for controlling said motor; a source of fluid pressure different from atmospheric pressure; means providing a communication between said source of fluid pressure different from atmospheric and said primary valve mechanism and means automatically operable when the rate of deceleration reaches a predetermined constant for maintaining the then existing power loading of the brake structure, said means including an inertia controlled governor comprising a weighted member mounted in aligned guides for movement longitudinally of the vehicle and controlled by the rate of change of velocity, and a secondary valve mechanism which is included in said communication means and which is arranged so that acceleration of the vehicle holds open the communication between said source of fluid pressure different from atmospheric pressure and the primary valve mechanism, and which is actuated solely as a function of the degree of deceleration of the vehicle body and operates independently of changes in the speed of rotation of the driving wheels.

19. A braking system comprising a brake structure, a foot pedal, a source of fluid pressure different from atmospheric pressure, a servo motor for operating said brake structure, a primary valve means having relatively movable parts one of which is connected to said pedal and the other of which is connected to said brake structure for operating said brake structure manually and for controlling the power braking by a followup action for controlling the operation of said motor, a secondary valve means operable to close communication between said source of fluid pressure different from atmospheric pressure and said servo motor but held in position usually to allow said source of fluid pressure different from atmospheric pressure to be connected to said servo motor to permit the application of braking pressure under the control of said primary valve means for controlling said motor, and a weight activated by any changes in the rate of velocity of the vehicle above a predetermined factor of acceleration or deceleration for controlling said secondary valve means to close said communication.

20. A braking system comprising a brake structure, a servo motor for operating said brake structure, a source of fluid pressure different from atmospheric pressure, a primary valve means for controlling the operation of said motor and operable to close communication between said source of fluid pressure different from atmospheric pressure and said servo motor but held in a position usually to allow said source of fluid pressure different from atmospheric pressure to be connected to said servo motor to permit the application of braking pressure under the control of said primary valve means, a secondary valve means for controlling said motor, a weight activated by any changes in the rate of velocity of the vehicle above a predetermined factor of acceleration or deceleration for controlling said secondary valve means to close said communication, a conduit connecting said source with said secondary valve mechanism, a conduit connecting said secondary valve means with the primary valve means, and a conduit connecting the primary valve means with the fluid pressure servo motor.

21. A braking system comprising a brake structure, a servo motor for operating said brake structure, a source of fluid pressure different from atmospheric pressure, a primary valve means for controlling the operation of said motor, means providing a communication between said source of fluid pressure different from atmospheric pressure and said primary valve including a secondary valve means for controlling said motor, means providing a communication between said primary valve and said servo motor, and a weight activated by any changes in the rate of velocity of the vehicle above a predetermined factor of acceleration or deceleration for controlling said secondary means, said secondary valve means comprising a valve operable to close communication between said source of fluid pressure different from atmospheric pressure and said servo motor but held in a position to allow said source of fluid pressure different from atmospheric pressure to be connected to said servo motor to permit the application of braking pressure under the control of said primary means except when said weight is activated, and being arranged so that acceleration of the vehicle holds open the communication between said source of pressure different from atmospheric pressure and the primary valve, and so that the secondary valve means is actuated solely as a function of the degree of deceleration of the vehicle body and is operated independently of changes in the speed of rotation of the driving wheels.

22. A braking system comprising a brake structure, a fluid pressure motor for operating said brake structure, a source of fluid pressure different from atmospheric pressure, a pair of valves for controlling the operation of said motor, each movable from a position connecting said source with said motor through a position in which said connection is cut off to a position in which said motor is connected with the atmosphere, a pair of relatively movable parts in one of said valves, means for controlling said valve by the operator including a pedal connected to one of said relatively movable parts, means for controlling the other of the valves by inertia, and means for connecting the other of said relatively movable parts to said brake structure for operating said brake structure manually.

23. A braking system comprising a brake structure, a fluid pressure motor for operating said brake structure, a source of fluid pressure different from atmospheric pressure, a pair of valves for controlling the operation of said motor, each movable from a position connecting said source with said motor through a position in which said connection is cut off to a position in which said motor is connected with the atmosphere, means for controlling one of said valves by the operator, means for controlling the other of the valves by inertia, a conduit connecting said source with one said valve, a conduit connecting said other valve with said first valve, and a conduit connecting said first valve mechanism with the fluid pressure servo motor.

24. A braking system comprising a brake structure, a fluid pressure motor for operating said brake structure, a source of fluid pressure different from atmospheric pressure, a primary valve and a secondary valve for controlling the operation of said motor, each movable from a position connecting said source with said motor through a position in which said connection is cut off to a position in which said motor is connected with the atmosphere, means providing a communication between said source of fluid pressure different from atmospheric and said primary valve including a connection between said source and said secondary valve, a connection between said primary valve and said fluid pressure motor, and a connection between the primary and secondary valves, means for controlling said primary valve by the operator, and means for controlling the secondary valve by inertia, said secondary valve being arranged so that acceleration of the vehicle holds open the communication between said source of pressure different from atmospheric pressure and the primary valve, so that it is actuated solely as a function of the degree of deceleration of the vehicle body and operates independently of changes in the speed of rotation of the driving wheels.

25. A braking system for an automotive vehicle provided with an internal combustion engine and an intake manifold comprising brakes, valve means, a manually operable member for controlling said valve means, a servo motor and fluid connections between said manifold, valve means and motor providing a fluid path, an auxiliary valve member in said aforementioned connections, said valve member comprising a casing secured to the chassis of the vehicle, and an inertia member stationary except when the acceleration or deceleration of the vehicle exceeds a certain predetermined value but movable relative to the casing within the casing at a predetermined deceleration of the vehicle to interrupt said fluid path and to thereby automatically control the energization of said motor and its actuation of the brakes.

26. A braking system comprising wheel brakes, a fluid pressure motor for actuating said brakes, connections between said motor and said brakes, a source of fluid pressure different from atmospheric pressure, fluid connections between said source and said motor, a valve arranged to be manually operated for controlling said motor interposed in said connections, manual means for operating said valve, and an inertia controlled valve also interposed in said connections and positioned therein between said manually controlled valve and said source, said inertia controlled valve being effective upon predetermined deceleration of said vehicle to limit the supply of differential fluid pressure to said control valve and to said motor.

27. A vehicle braking system comprising wheel brakes, a manually operating member, brake operating parts, a fluid pressure power motor for operating said brake operating parts, a connection between said fluid pressure power motor and said brakes, a source of fluid pressure different from atmospheric pressure, a connection between said source of fluid pressure different from atmospheric pressure and said motor, and a primary valve and a secondary valve interposed in said connection, said secondary valve being controlled by inertia to shut off said connection whenever the deceleration of the vehicle exceeds a certain predetermined amount, the primary valve comprising movable parts, one of which is connected to said manually operating member and the other of which is connected to said brake operating parts, whereby movement of said manually operated member opens said primary valve to actuate said motor and movement of said brake operating parts by said motor toward the applied position operates said primary valve to cut off said connection.

28. A braking system comprising wheel brakes, a fluid pressure motor for operating said brakes, a source of fluid pressure different from atmospheric for actuating said motor, connections between said motor and said brakes, a valve for controlling said motor actuated solely as a function of the degree of deceleration of the vehicle body and operated independently of changes in the speed of rotation of the driving wheels, inertia means for controlling said valve comprising a weight movable to close off the connection between said source of fluid pressure different from atmospheric and said motor when the deceleration exceeds a certain predetermined value, spring means for holding said inertia member in position to allow said valve to connect said source with said motor when said vehicle is standing still, is being accelerated, or is being decelerated at less than the predetermined rate.

DAVID L. GALLUP.